United States Patent
Wandeler et al.

(10) Patent No.: US 9,542,378 B2
(45) Date of Patent: Jan. 10, 2017

(54) SYSTEM AND METHOD FOR DEPLOYING A FORM TEMPLATE ON MULTIPLE PLATFORMS

(75) Inventors: Florentin N. Wandeler, Kanata (CA); Jason Hightower, Port Coquitlan (CA)

(73) Assignee: Adobe Systems Incorporated, San Jose, CA (US)

(*) Notice: Subject to any disclaimer, the term of this patent is extended or adjusted under 35 U.S.C. 154(b) by 1082 days.

(21) Appl. No.: 12/565,432

(22) Filed: Sep. 23, 2009

(65) Prior Publication Data

US 2014/0033011 A1    Jan. 30, 2014

(51) Int. Cl.
*G06F 17/00* (2006.01)
*G06F 17/24* (2006.01)

(52) U.S. Cl.
CPC ........... *G06F 17/243* (2013.01); *G06F 17/248* (2013.01)

(58) Field of Classification Search
CPC ............................. G06F 17/243; G06F 17/248
USPC ................................................... 715/221–226
See application file for complete search history.

(56) References Cited

U.S. PATENT DOCUMENTS

| | | | | |
|---|---|---|---|---|
| 6,904,412 | B1 * | 6/2005 | Broadbent | G06Q 10/10 705/38 |
| 7,143,344 | B2 * | 11/2006 | Parker | G06F 17/24 715/236 |
| 7,197,515 | B2 * | 3/2007 | Rivers-Moore | G06F 17/2247 |
| 7,281,018 | B1 * | 10/2007 | Begun | G06F 17/218 |
| 7,313,757 | B2 * | 12/2007 | Bradley | G06F 17/243 715/222 |
| 7,451,392 | B1 * | 11/2008 | Chalecki | G06F 17/2247 707/E17.061 |
| 7,500,178 | B1 * | 3/2009 | O'Donnell | G06F 17/243 707/999.01 |
| 7,610,548 | B1 * | 10/2009 | Brinkman | G06F 17/248 707/999.103 |
| 7,644,351 | B1 * | 1/2010 | Portnoy | G06F 17/243 715/224 |
| 7,653,592 | B1 * | 1/2010 | Flaxman | G06Q 40/00 705/35 |
| 7,941,743 | B2 * | 5/2011 | Reddy | G03G 15/5091 358/1.15 |

(Continued)

OTHER PUBLICATIONS

Bertrand Delacrétaz; "How to Publish XML Documents in HTML and PDF"; http://web.archive.org/web/20040203003702/http://cocoon.apache.org/2.1/howto/howto-html-pdf-publishing.html.*

*Primary Examiner* — Scott Baderman
*Assistant Examiner* — Benjamin J Smith
(74) *Attorney, Agent, or Firm* — Shook, Hardy & Bacon L.L.P.

(57) ABSTRACT

The present embodiments are directed to systems and methods of creating and deploying electronic forms for collecting information from a user using a browser or other application. Various embodiments herein include features for automatically selecting and configuring services for rendering and submitting intelligent forms or other data structures in an automated process environment. The automated process environment may include features which permit an enterprise to blend electronic forms, process management, document security, and document generation capabilities to deliver applications which may reduce paperwork, accelerate decision-making processes, and help ensure regulatory compliance.

14 Claims, 4 Drawing Sheets

(56) References Cited

U.S. PATENT DOCUMENTS

| | | | | |
|---|---|---|---|---|
| 8,006,176 B2* | 8/2011 | Reddy | G06F 17/243 | 358/1.15 |
| 8,078,960 B2* | 12/2011 | Chalecki | G06F 17/2247 | 715/205 |
| 8,347,295 B1* | 1/2013 | Robertson | G06Q 10/06 | 718/103 |
| 8,539,493 B1* | 9/2013 | Robertson | G06F 9/4881 | 718/103 |
| 2002/0194219 A1* | 12/2002 | Bradley | G06F 17/243 | 715/223 |
| 2003/0014442 A1* | 1/2003 | Shiigi | G06F 8/20 | 715/255 |
| 2003/0106021 A1* | 6/2003 | Mangrola | G06F 17/2247 | 715/236 |
| 2003/0237046 A1* | 12/2003 | Parker | G06F 17/24 | 715/234 |
| 2004/0181774 A1* | 9/2004 | Ohsugi | G06Q 10/0633 | 717/102 |
| 2005/0015711 A1* | 1/2005 | Yamamoto | G06Q 10/06 | 715/255 |
| 2005/0049961 A1* | 3/2005 | Hansen | G06Q 40/025 | 705/38 |
| 2005/0147946 A1* | 7/2005 | Ramamurthy | G06Q 99/00 | 434/118 |
| 2006/0095542 A1* | 5/2006 | Reddy | G03G 15/5091 | 709/217 |
| 2006/0101005 A1* | 5/2006 | Yang | G06F 17/3087 | |
| 2006/0136810 A1* | 6/2006 | Truong | G06F 17/243 | 715/222 |
| 2007/0192678 A1* | 8/2007 | Tang | G06F 17/243 | 715/234 |
| 2008/0046806 A1* | 2/2008 | Reddy | G06F 17/243 | 715/221 |
| 2008/0091780 A1* | 4/2008 | Balan | H04L 63/0428 | 709/204 |
| 2008/0098291 A1* | 4/2008 | Bradley | G06F 17/243 | 715/223 |
| 2008/0120226 A1* | 5/2008 | Wegmann | G06Q 40/00 | 705/38 |
| 2009/0106234 A1* | 4/2009 | Siedlecki | G06F 17/30864 | |
| 2009/0171910 A1* | 7/2009 | Sarkeshik | G06Q 10/00 | |
| 2009/0183063 A1* | 7/2009 | Malkin | G06F 17/243 | 715/222 |
| 2010/0023368 A1* | 1/2010 | Houba | G06Q 10/06 | 705/7.27 |
| 2010/0174974 A1* | 7/2010 | Brisebois | G06F 17/243 | 715/223 |
| 2010/0192053 A1* | 7/2010 | Fujiwara | G06Q 10/06 | 715/222 |
| 2010/0251092 A1* | 9/2010 | Sun | G06F 17/243 | 715/222 |
| 2011/0113008 A1* | 5/2011 | Jafri | G06F 17/30867 | 707/608 |

* cited by examiner

SYSTEM AND METHOD FOR DEPLOYING A FORM TEMPLATE ON MULTIPLE PLATFORMS

BACKGROUND

With the growing use of communications networks such as the Internet, it has become more common for companies and other users to serve electronic forms or documents in a variety of ways over networks to clients, customers, or other end users. The end users may use a computer or other electronic device and a browser running on this device to access a web page, for example to view a form or document and to complete the form and then submit the form data back to a web server for processing of the data.

For example, a client of a web service provider may provide insurance information using such a served form or a customer may provide credit card or other purchasing information to complete a purchase via a fillable form. In other cases, enterprises or businesses may allow employees to generate letters or packages that are then transmitted to recipients such as customers on a large customer list using such a finable form or document. Often, these fillable forms or documents are rendered or created as document, letter, package, or form templates. During rendering, data may be retrieved from a data source and merged into the template to create a document or form to be served to a client device.

SUMMARY

Various embodiments herein include one or more of systems, methods, software, and/or data structures to automatically select and configure services for rendering and submitting intelligent forms or other data structures in an automated process environment. As an example, the automated process environment may include features which permit an enterprise to blend electronic forms, process management, document security, and document generation capabilities to deliver applications which may reduce paperwork, accelerate decision-making processes, and help ensure regulatory compliance. The following embodiments and aspects thereof are described and illustrated in conjunction with systems, tools, and methods which are meant to be exemplary and illustrative, and not limiting in scope.

According to a first aspect, a computer-implemented method is provided that may include retrieving a form definition template from a data storage. The form definition template may include an electronic document and defines a form that includes electronic form data to be displayed to a user. In addition, the form definition template may be deployable on one or more platforms when rendered into a runtime format. The method also includes retrieving behavior information (or "hints") associated with the form definition template. Further, the behavior information may specify a render service to be used to render the form definition template from a design format to a runtime format. The method may also include: using the behavior information, associating a render service with the form definition template in a data storage.

According to a second aspect, a computer system including a processor and a data storage is provided. The data storage may store a plurality of form definition templates. Each of the form definition templates may include an electronic document and may define a form that includes electronic form data to be displayed to a user. Further, the plurality of form definition templates may be deployable on one or more platforms when rendered into a runtime format. The data storage may also store behavior information (or "hints") associated with each of the form definition templates. The hints may be stored with its associated form definition template or separately. Further, the behavior information may specify a render service to be used to render each form definition template from a design format to a runtime format and a submit service to be used to capture data submitted by a user of a form rendered from one of the plurality of form definition templates. The data storage may also store a process design module that includes a behavior information retriever module. The process design module may be run by the processor to generate a process that includes at least one of the plurality of form definition templates. Additionally, the behavior information retriever module may be run by the processor to retrieve the behavior information associated with a form definition template included in the process and, in response, to associate a render service and a submit service with the included form definition template.

According to a third aspect, a computer-implemented method is provided that includes generating a form definition template that includes an electronic document and defines a form that includes electronic form data to be displayed to a user. The form definition template may be deployable on one or more platforms when rendered into a runtime format. The method also includes generating behavior information (or "hints") associated with the form definition template. The behavior information may specify a render service to be used to render the form definition template from a design format to a runtime format. The method further includes storing the behavior information associated with the form definition template in a data storage structure.

In addition to the exemplary aspects and embodiments described above, further aspects and embodiments will become apparent by reference to the drawings and by study of the following descriptions.

DETAILED DESCRIPTION

Various embodiments herein include one or more of systems, methods, software, and/or data structures to automatically select and configure services for rendering and submitting intelligent forms or other data structures in an automated process environment. As an example, the automated process environment may include features which permit an enterprise to blend electronic forms, process management, document security, and document generation capabilities to deliver applications which may reduce paperwork, accelerate decision-making processes, and help ensure regulatory compliance. The specific details of the various systems and methods described herein are presented below with reference to FIGS. 1-4.

Figure 1:
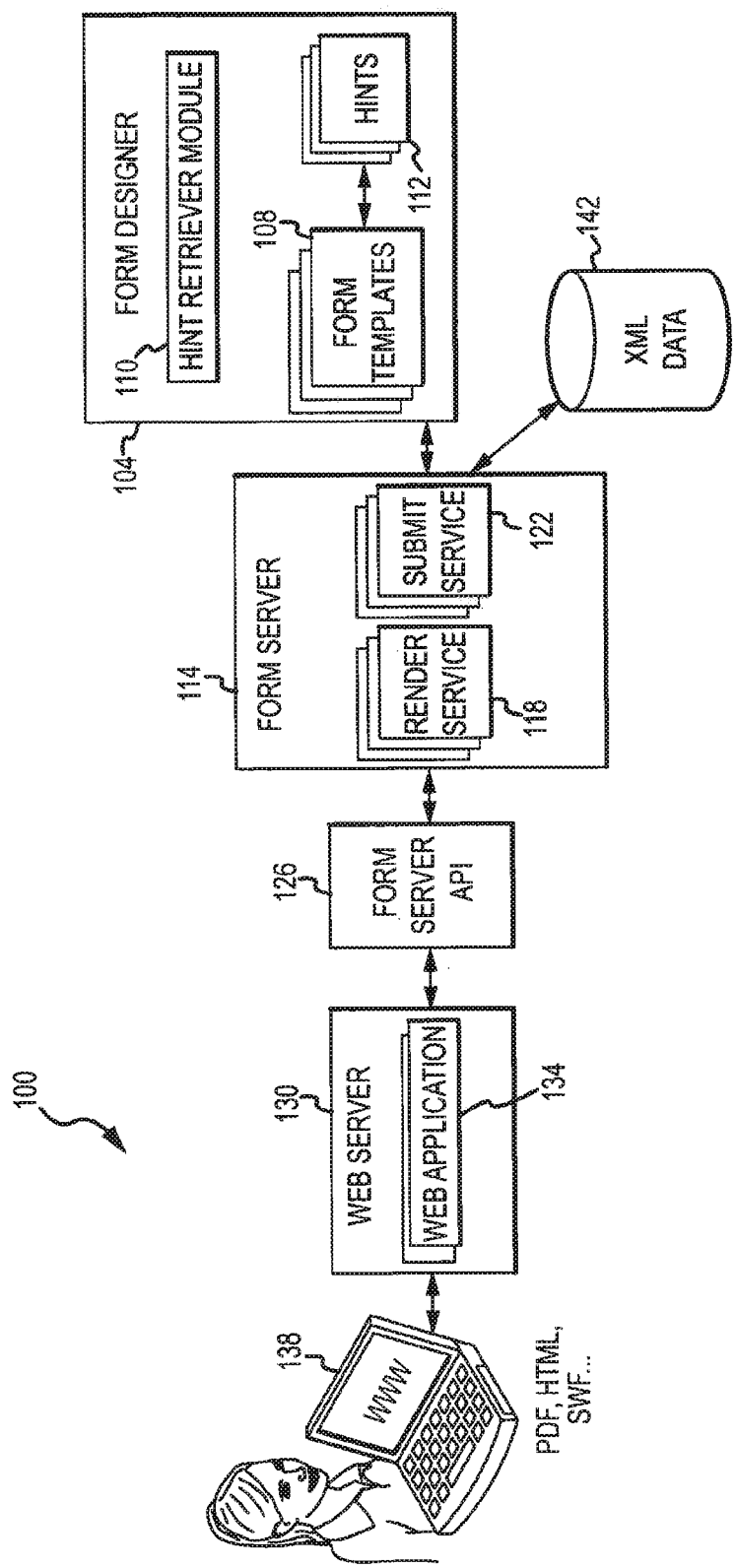
FIG. 1 illustrates an overall block diagram of a system according to an exemplary embodiment.

An embodiment of an exemplary system 100 is shown in FIG. 1. This embodiment includes two main components: a Form Designer 104 and a Form Server 114. The Form Designer 104 (or "Process Designer," or simply "Designer") may allow a form designer and/or a process (or "workflow") designer to design e-forms, to preview forms while designing, and to develop processes that utilize one or more forms. The Form Server 114 (or simply "Server") enables the access of completed forms using a Web Server 130 running one or more web applications 134 for public access. The Designer 104 and the Server 114 may reside at the same computer system as the Web Server 130 or a separate and independent system.

The Designer 104 or another application may be used to create intelligent, reusable form definition templates 108. The Designer 104 may provide a simple way to create and maintain e-forms without involving third-party tools. Further, the Designer 104 may create templates 108 (typically XML Forms Architecture ("XFA")) or structured XML user-interface "form" definitions that render the data and the presentation specified by the template 108 in a format suitable for a user's run-time environment.

Employing graphical design tools for user interfaces of the Designer 104, form or process designers may easily include list boxes, drop down lists, command buttons, radio buttons, check boxes, lines, circles, images and static text, e.g., anything they need to create a form. The Designer 104 can also be used to incorporate database lookups, calculations, automatic formatting, choice lists and even automatic error checking to prevent respondents from entering incorrect data and delaying the processing of their e-forms.

The second component of the system 100, the Form Server 114, may be a server that takes form templates 108 created with the Designer 104 and delivers them in any of a number of browsers 138 (or applications operative to display forms such as web browsers, Adobe Acrobat, FLASH players, and the like). In this document, the term "Server" is generally used to refer to this type of server, referring to the computer code effecting the functionality. Communication with the Server 114 may refer to a number of means, whether entirely in the same physical system or by telecommunication means, or a combination of such means.

The Server 114 may also allow, in a variation, a user to enter data into a form while disconnected from the Internet, i.e., offline. The form may be single-paged or multi-paged. A package, containing form information, may be prepared by the Server 114 when invoked, typically by a programming interface. In one example, the package may be downloaded to a separate system of the user. The user may then be able to use his or her browser (or application) to access the content of the package and fill in the form while disconnected from the Internet. Subsequently, the user may have the option of going online to submit a completed form or submit a partially submitted form for validation.

This latter aspect may be implemented as a standalone system or software; alternatively it may be a subcomponent of the Server 114. In other words, the Server 114 may be able to both perform (1) packaging of the form template and then transmitting the package to the local user system, and (2) transforming the form template and then delivering the browser language file for display/rendering on the user system. It may also simply provide functionality to prepare a package of the form template and then possibly transmit the package to the local user system, without the more typical feature of receiving form input from an online user.

The Server 114 may also be operative to take a form definition template 108 created with the Designer 104 and to deliver it in any of a number of browsers (or application formats). In this regard, templates may be designed once and then deployed to any number of users, allowing organizations to manage their e-process and e-business initiatives without creating and maintaining a user interface to accommodate each browser or application type.

The Server 114 may deliver the run-time form in the appropriate language or format, for instance, Hyper Text Markup Language (HTML), Portable Document Format (PDF), FLASH (SWF), or the like. The Server 114 may extract a form's field information, such as the type and the positioning of data for a form, and a form's boilerplate information, such as the lines and the static text, from the template 108 and may convert it to a format that suits the target form for viewing on a user's system. To accomplish this, the Form Server 114 may include a plurality of render services 118 operative to render form templates 108 in a number of different runtime formats which are viewable on a user's computer system 138. For example, one render service 118 may render a form template 108 into PDF format, while another render service 118 may render a form template 108 into SWF format. Additionally, each render service 118 may include configuration information such as input parameters (e.g., Adobe Acrobat Reader enabled), user defined parameters, and others.

The Server 114 may also provide intelligent templates for user interfaces. In this regard, an enterprise can validate a user's data entry before processing by performing calculations, accessing databases, or enforcing business rules on field-level data. Whenever data is submitted to the Server 114 using one of a plurality of available submit services 122, the Server 114 may merge the data it has received into the template and execute the business logic contained in the template. The resulting data may then be returned to the user's browser.

The submit services 122 may generally be used to capture data from a user inputting data into a rendered form. The submit services 122 may determine the file format for the captured data. As an example, submit services 122 may be operative to handle captured data in numerous submit formats including XML Data package (XDP) format, PDF format, XML Data format, URL-encoded Data format, and others. In addition, the submit services 122 may include other items in the submit package, including annotations, digital signatures, PDF files, templates, and other items.

To allow end-users to print and save forms locally, the Server 114 may convert the template 108 (typically XFA), with or without merged data from a data storage 142, to another format suitable for printing, such as PDF. Unlike with ordinary HTML forms that print using the web browser, enterprises can precisely control the layout and pagination of these forms. In this regard, users can therefore print their filled-out forms such as license applications, customer statements, invoices, order confirmations, contracts, insurance policies, change of address forms and the like, for their records. They can also sign them and mail them to comply with laws, regulations or policies, where required.

The Server 114 may be accessible by users' computer systems 138 via an Application Programming Interface 126 ("API"). In this regard, the Server 114 may become active when it is requested (via the API 126) to perform a function by the web server 130 (e.g., a request to serve a rendered form to a user's computer system 138).

As can be appreciated, XML (eXtensible Markup Language) may be used for its versatility. As a system for defining, validating and sharing document formats, XML has emerged as the basis for business-to-business (B2B)

communications on the Internet. However, the embodiments described herein are not necessarily limited to the use of XML as a specification as is clear to a person skilled in the art. Generally, XML Forms Architecture ("XF A") is an open, public specification that defines how a form will appear and act in an XML environment. This open architecture ensures that form solutions expand with the needs of the enterprise and integrate easily with products from other vendors. By separating its data elements from the details of its graphic presentation, XF A assumes no proprietary data schema, which means that an enterprise can use the system for a broad range of e-process operations. Because XFA works with a large number of browsers or computer platforms, an enterprise can confidently treat all users in the electronic domain the same.

In one or more embodiments, end users may access the Server 114, by a browser or otherwise, to retrieve a form package containing a form, which typically may be developed earlier by a form designer or process designer using the Designer 104. The Server 114 may transform the form into an offline form package. The offline form package may include all the pages in the form in the appropriate language supported by the browser or application, any associated images, and supporting client-side scripts. Typically, the end user may save this form package to his or her local system and can disconnect from the Internet without affecting completion of the form. As can be appreciated, the form package may be saved to any system accessible to the user. The end user may then open the offline form package to access the form. The end user can subsequently fill in the form and save the data locally (or anywhere accessible to the user) while offline (e.g., while disconnected from the Internet). In addition, the user can open previously saved form data to complete a form before submitting it, typically back to the Server 114.

The Application Programming Interface (API) 126 is generally the method used by Web applications 134 to communicate with, and access the services of, the Server 114. The API 126 may be used to interface with the Server 114 and integrate the Server 114 functionality into Web applications 134. As mentioned earlier, the Server 114 is typically stateless, and is therefore typically accessible via the API 126. This means that the Server 114 typically becomes active when it is requested (via the API 126) to perform a function.

The Web applications 134 may provide the end user with access to Web facilities. This can be done using HTML pages, Application Server Pages ("ASP"s), ColdFusion pages, and others. Using the API 126, the web applications 134 may gather information from the end users (e.g., using computer systems 138). From a single template, the Server 114 may determine the browser type and then transform the form template 108, with or without data from the data storage 142, into a format that best suits that particular browser or application type using an appropriate render service 118.

Embodiments described herein may produce and read form data in an XML format. This enables organizations to exchange data between form and non-form applications using standard XML processing tools. As mentioned earlier, the embodiments described herein are not limited to XML, but the following serves as a description of how the features could be implemented using XML.

The template 108 may generally include the form layout information created using Designer 104. The template 108 generated by the Designer 104 is typically (but not exclusively) an XML-based document (typically XFA) that contains all information such as form object placement, naming, display properties, validations, and calculations. The form template 108 (also known as form definition template) may be edited by a form designer and is typically not changed by the user. Generally, the template 108 may contain all of the information necessary to display and manipulate the data displayed to the user.

The form data stored in the data storage 142 represents the content entered by the user and data generated by calculations housed in the form template 108. As an example, the data 142 may be saved in an XML document. The template 108 typically contains all of the static information such as object names, drop down lists, calculations, number formatting, and the like, while the associated data file may contain the information entered by the user at runtime. Additionally, the content saved in the data file may be structured to respect page, group, and data record information.

Security features may be added to forms to verify that form data has not been tampered with. Using a signature object, one can protect the integrity of forms by allowing end users to use certificates to digitally sign form data. Once the data is signed, it cannot be altered on the form. Verifying the signature guarantees that no one has tampered with the data after it was submitted. When a user signs a form, a message digest of the data to be signed is created and a mathematical computation combines the user's private key with the specified form data and encrypts them together. The output is a digital signature. This digital signature contains the locked form object values and the certificate information of the person who signed the form. When viewed as part of the submitted XML form data, the encrypted data is unreadable. When the Server's cryptographic component verifies the signature, it uses the public key to read the signed data and compares the signed data to the unencrypted data on the form. If the encrypted and unencrypted data do not match, this means that the data has been tampered with since it was signed and the verification fails.

Using an appropriate render service 118, the Server 114 may deliver a form and render it in the format that best matches the presentation and form filling capabilities of the target browser or application. The render service 118 may accomplish this by extracting the field information and the boilerplate information from the form template 108 (typically XFA-XFT). The render service 118 may then convert the form template 108 to a version that is suitable for a particular browser or application. For example, the render service 118 may render the form in to a PDF, HTML, SWF, or other file formats.

The Server 114 may also execute validations and calculations included on the form and return the resulting data to the browser. Calculations and validations can also be executed on the client side using a script language such as JavaScript. Most intelligence in the forms may typically be executed on the Server 114. For example, when a user clicks on a button on a form, the data may be posted to the Server 114. The Server 114 may then merge the received data into the form template and executes any programming associated with the button that was clicked. In some cases, client-side calculations and validations may be supported by the browser or application, allowing intelligence to be executed by the browser or application on the client side.

When end users request a form from the Server 114 (or click a button or image on a form), they initiate a series of specific processes and interactions between the Server 114, their browser, and the web application 134. When a user requests a form, the web application 134 may initiate a method to request the form from the Server 114. The call to the Server 114 may include the name of the requested form and the form presentation. When the user environment is unknown, the render service 118 may determine the format in which to render the form based on the browser or application information that is passed with the method call. The render service 118 of the Server 114 may then transform the form template 108, form images, and data into output suitable for the target browser or application.

As noted above, one or more form templates 108 may be used by a process (or workflow) designer to create an automated process. One or more form templates 108 may be used in a multi-step process that involves multiple users executing multiple tasks. A task represents an action that a user needs to complete in order for the next step in the process to occur. An example process may include a mortgage application process. Initially, a loan applicant may request and complete an interactive mortgage application form. Next, the form may be routed to a decision maker for approval. In addition, a decision or a request for more information may then be provided to the loan applicant to further the loan application process. As can be appreciated, the process designer may include several automatic and/or manual steps in the process for completing the loan application sequence.

Generally, when a process designer wishes to add a form template 108 to a particular workflow, the process designer needs to first select an appropriate render service 118 for the selected form template 108. In addition to selecting a render service 118, the process designer may also need to configure the settings of the selected render service 118. As well as selecting and configuring the render service 118, the process designer may typically have to select and configure a submit service 122 for the form template 108 as well. As can be appreciated, these selection and configuration steps may be time consuming, repetitive, and error prone. For example, the process designer may have to first determine what render and submit services are available, and then configure the parameters of the selected services as supported by the particular features of the form template 108 (e.g., a form template 108 may only be able to be rendered in HTML). In addition, the process designer may have a difficult time determining what data structure (e.g., XML schema, or other data structures) is required by the selected form template 108, which may be important for interpreting data submitted by a submit service 122 to other steps in the workflow.

To address the above-noted issues and other issues, the present system 100 includes "hints" 112 or behavior information (e.g., program code) associated with the form templates 108. In operation, a form designer may develop hints 112 for each form template 108 that specify behavior information about the templates 108. Such information may include which render services 118 and submit services 122 to use, configurations for the render services 118 and submit services 122, which data structures (e.g., XML schema, or other data structures) to be used with the form template 108, as well as other behavior information. Such other behavior information may include: in what format the form submits data (e.g., XDP, PDF, email, or the like); whether the form includes process fields (e.g., to allow users to control the path of a work flow); the data structure of the form; what type of PDF form the form is (e.g., Acroform, Flat, XFA, or the like); whether the form supports being rendered as a Form Guide; a list of variations available in a form (e.g., different views of the same form, such as an "initial view" and an "approval view"); whether the form supports various submit features of one or more applications or browsers; whether the form supports commenting; whether the form supports encryption; and other behavior information.

Using the hints 112 for a form template 108, a process designer using the Designer 104 to develop a process does not need to manually determine behavior information for a form template 108 prior to adding the form template 108 to a process. In this regard, when a form template 108 is added to a process, a hint retriever module 110 associated with the Designer 104 may "retrieve" the hints 112 for the form template 108, and then automatically select and configure the render service and submit service for the form template 108. Further, the hint retriever module 110 may retrieve the hints 112 to determine which data structure should be used for the form template 108. As can be appreciated, by automatically selecting the render services 118 and the submit service 122, the process designer may develop processes using form templates 108 in a more efficient and less error-prone manner.

Figure 2:
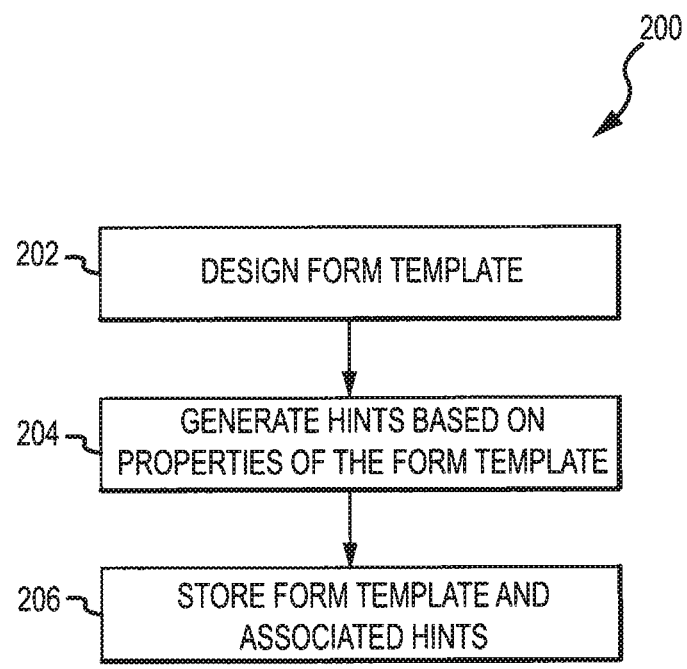
FIG. 2 illustrates a flow chart for a process for generating hints for form definition templates.

FIG. 2 illustrates a flow chart for a process 200 for associating hints (or behavior information) with a form template, such as during operation of the system 100 shown in FIG. 1. As an example, the process 200 may be implemented by a form designer developing a form template 108 using a form designer application of the Designer 104 shown in FIG. 1. Initially, the form designer may design a form template (step 202). As noted above, the form template may include list boxes, drop down lists, command buttons, radio buttons, check boxes, lines, circles, images and static text, e.g., things useful to create a particular form. Further, database lookups, calculations, automatic formatting, choice lists and even automatic error checking may be incorporated into the form template. The form template may be designed to include various properties which need the selection of specific render services and submit services (e.g., the form template can only be rendered in certain file formats, the form template can only submit captured data in specific formats, and the like).

The form designer may then generate hints (e.g., the hints 112 shown in FIG. 1) associated with the form template (step 204). For example, the hints may be program code written by the form designer that, when retrieved, provides behavior information to a process designer application using the form template in a process. Once the hints have been generated, the form template and its associated hints may then be stored in a data storage (step 206), such as the data storage 142 shown in FIG. 1, where they may be subsequently retrieved by a process designer application.

Figure 3:
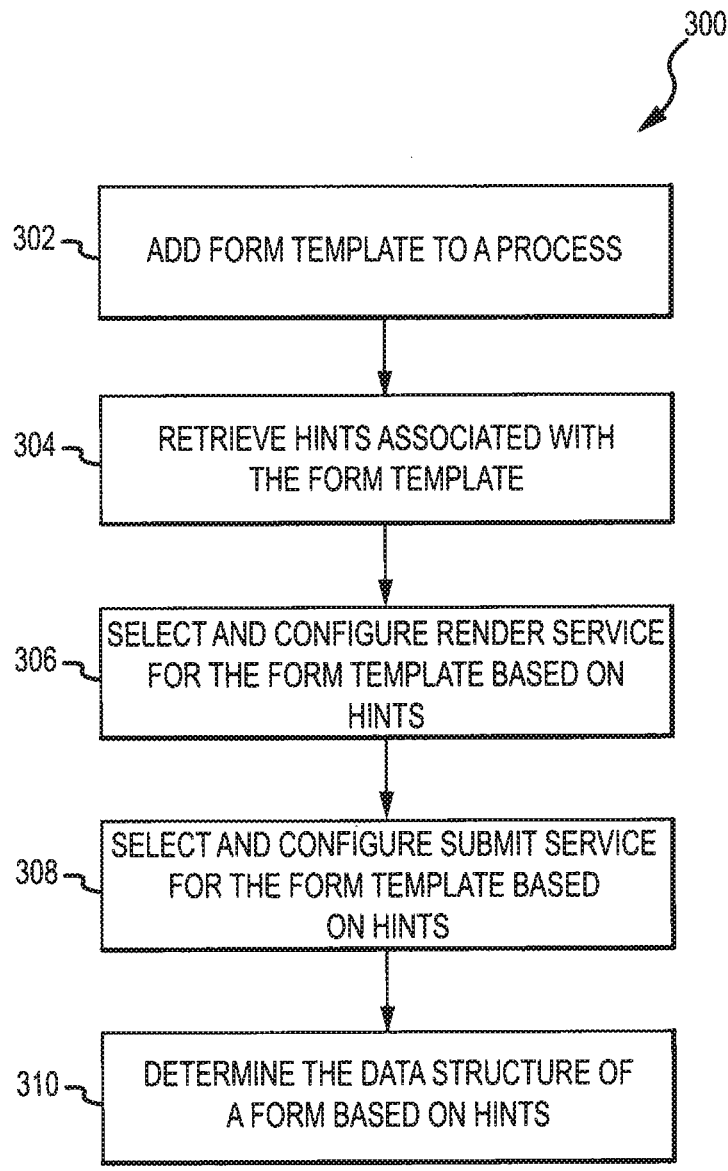
FIG. 3 illustrates a flow chart for a process for using hints to automatically select a render service and a submit service for a form definition template.

FIG. 3 illustrates a flow chart of a process 300 for using hints to automatically select and configure render services and submit services for a form template selected as part of a process or workflow. As an example, the process 300 may be implemented by a process designer developing a workflow using a process designer application of the Designer 104 shown in FIG. 1. Initially, a process designer may add a form template to a process (step 302). Continuing with the example above, the form template may include a mortgage loan application form. Next, (step 304) the process designer application may retrieve the hints associated with the added form template, e.g., using hint retriever module such as the hint retriever module 110 shown in FIG. 1. In one or more embodiments, the hint retriever module 110 may retrieve the hints of the form template dependent upon a characteristic such as the file type of the form template (e.g., by reading the file extension of the form template). Once the hints have been retrieved, the render service and the submit service for the form template may be automatically selected and configured (steps 306 and 308). In addition, the data structure or other features to be used for the form template may be automatically determined using behavior information provided by the hints (step 310). In this regard, there is no need for a process designer to manually select and configure the render and submit services, to manually determine the data structure of the form, or to manually determine other information regarding the form template included in the behavior information provided by the hints.

Figure 4:
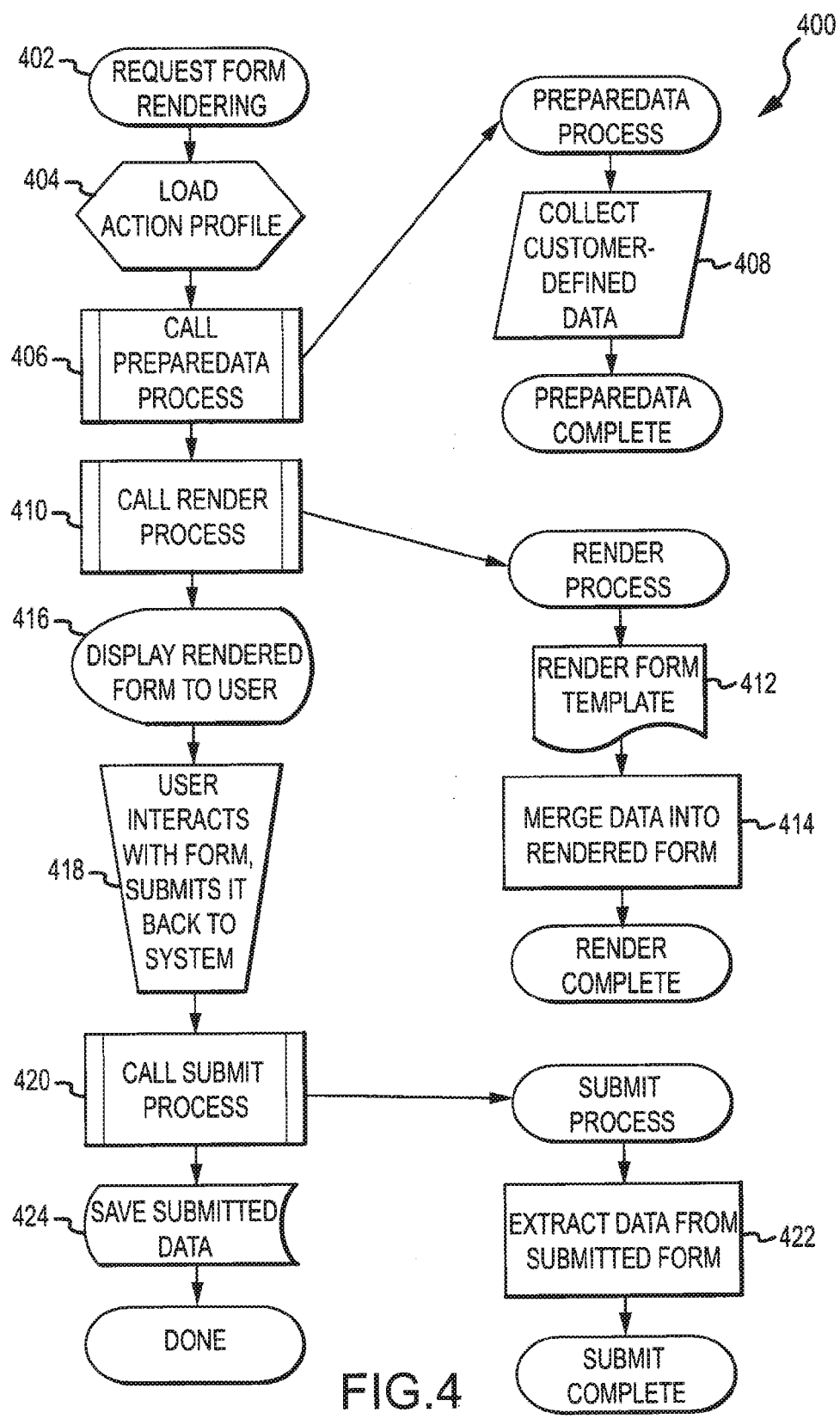
FIG. 4 illustrates a flow chart for a process for rendering a form, presenting the form to a user, and capturing data input into the form by the user.

FIG. 4 illustrates a flow chart for a process 400 for rendering a form, presenting the form to a user, and capturing data input into the form by the user. The process 400 may be implemented on a computer system, such as the system 100 shown in FIG. 1. As noted above, the system 100 shown in FIG. 1 deals with the creation of forms as well as the manipulation of forms and form data and their integration within processes (or workflows). Often, a form's fields may be bound to elements of a data structure in order to facilitate the merging of data that flows through processes. This binding between the form and the process may generally be defined by a process template. Further, the form presentation seen by a user may usually be the result of a transformation of a form template into which form data has been merged. This form data may originate from customer-defined sources, such as databases, web services, and the like. At design-time, a form designer may specify fields for a form and may optionally bind the fields to a data structure. Then, a process designer may lay out operations in a sequence dictated by the specific needs for the process. As noted above, some of these operations may require human interaction. For operations that require human interaction, a form variable may be used which includes references to: the form template to be used; the render service (or render process) to call to obtain the desired rendering transformation, including data to be merged; and the submit service (or submit process) to call to extract properly-formatted data from the submitted form data.

In the process 400 shown in FIG. 4, the steps for designing a process are simplified by utilizing configuration units that group together: 1) a process used to retrieve data to be merged into a form ("prepare data process"); 2) a render process; and 3) a submit process. These configuration units are referred to herein as "Action Profiles." Generally, the process 400 simplifies process design by tying form rendering directives to associated form templates, rather than tying the form rendering directives to associated processes using the form templates. In this regard, associations between a form template and the render and submit processes used need not be redefined each time a form is used in another process. Further, by allowing process designers to customize prepare data processes independent of render and submit processes, the process 400 allows process designers to utilized default render and submit processes without having to spend the time to manually select and configure render and submit processes each time a form is used in another process.

The process 400 begins with a user requesting a form for rendering (step 402). As an example, a user may request a form using a browser of the computer system 138 shown in FIG. 1. Next, an Action Profile for the requested form may be loaded (step 404). As noted above, the Action Profile may specify a prepare data process, a render process, and a submit process for the requested form.

The process 400 may then call the prepare data process specified by the loaded Action Profile (step 406). The prepare data process may then proceed to collect customer-defined data to be merged into the form from one or more sources such as databases, web services, as well as other sources (step 408). Once the form data has been added to the form, the process 400 may call the render process specified by the Action Profile (step 410). As noted above, the render process may render the form template into a format viewable by a user (step 412). The render process may also merge form data into the rendered form (step 414).

Next, the rendered form may be displayed to a user in a suitable format, such as PDF, HTML, SWF, or the like (step 416). The user may interact with the form using a user interface, and then submit data entered to the form back to the system (step 418). Once the data has been submitted, a submit process specified by the Action Profile may be called (step 420), wherein data may be extracted from the submitted form in a predetermined format (step 422). As can be appreciated, once the formatted data has been captured, it may be used by other steps in the process dependent upon the specific application.

As noted above, in this embodiment, the prepare data process is separated from the render process. Advantageously, process designers may define prepare data processes without modifying default rendering processes. This feature may be beneficial since modifying rendering processes may be time consuming, repetitive, and error-prone. Additionally, as can be appreciated, the aforementioned "data structure hints" may be helpful to the designer of the prepare data process by providing information to the designer about the type and location of the data structure used in the form.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. Embodiments, such as the system shown in FIG. 1 and the methods 200, 300, and 400 of FIGS. 2, 3 and 4, of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus (such as the web services, the document and its intelligence/functions/scripts, and so on). The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A computer-implemented method, comprising:
   creating a form template by receiving input provided to a form-design program during a form-design process,
      wherein the form template that is created includes properties that utilize a render service and a submit service,
      wherein the input includes coded instructions that, when executed, specify the submit service and the render service, and
      wherein the form template is stored in association with the coded instructions that specify the submit service and the render service;
   designing a workflow by receiving a request to add the form template to a series of tasks to be automatically executed in an order during runtime, wherein the request to add the form template is received during a workflow-design process, which is separate from the form-design process;
   in response to the request to add the form template into the workflow during the workflow-design process, retrieving the coded instructions that are independent of the workflow being designed and are dependent on the form template, wherein the coded instructions specify the render service to render the form template from a design format to a runtime format and the submit service to capture information input into the form template during runtime; and
   automatically configuring, using a processor of a machine, the render service and the submit service to be executed with the form template at a subsequent runtime.

2. The method of claim 1, wherein the render service is operative to render the form template into a runtime file format selected from the group consisting of: portable document format (PDF) file format; Hyper Text Markup Language (HTML) file format; and a multimedia file format.

3. The method of claim 1, wherein the coded instructions specify a data structure for data that is captured by the submit service.

4. The method of claim 1, further comprising:
   rendering the form template into a runtime-format rendered form using the render service specified by the coded instructions;
   serving the rendered form to a user of a computer system;

capturing data submitted by the user using the submit service specified by the coded instructions; and storing the captured data in a data storage.

5. The method of claim 1, wherein the coded instructions specify a data structure for the form template.

6. The method of claim 1, wherein the coded instructions specify configuration information for the render service, the configuration information being used to automatically configure the render service.

7. A computer system, comprising:
a processor; and
a data storage storing:
  a form template that is stored in association with coded instructions, which specify a render service for rendering the form template in a runtime format and a submit service for capturing data input into the form template by a user during a runtime; and
  a workflow-design module that is leveraged to design a workflow prior to a runtime execution, wherein the workflow-design module designs the workflow by receiving a request to insert the form template into a series of steps, and wherein the workflow-design module automatically configures the render service and the submit service of the form template by retrieving the coded instructions from the data storage, the coded instructions being dependent on the form template and independent of the workflow.

8. The system of claim 7, wherein the render service is operative to render the form template into a runtime file format selected from the group consisting of: portable document format (PDF) file format; Hyper Text Markup Language (HTML) file format; and a multimedia file format.

9. The system of claim 7, wherein the coded instructions specify a file format for data that is captured by the submit service.

10. The system of claim 7, wherein the data storage stores:
a form server module, and a submit service module;
  wherein the form server module is executed by the processor to serve the rendered form to users; and
  wherein the submit service module is executed by the processor to capture data submitted by users of the rendered form.

11. The system of claim 7, wherein the coded instructions specify a data structure for the form template.

12. The system of claim 7, wherein the coded instructions specify configuration information for the render server, the configuration information being used to automatically configure the render service.

13. A non-transitory machine-readable storage medium, having instructions which when processed by a computer, cause the computer to perform operations comprising:
  designing a form template that includes an electronic document and defines a form, which includes electronic form data to be displayed to a user, the form template being deployable on one or more platforms when rendered into a runtime format and the form template being designed by executing a form-design application;
  receiving by the form-design application coded instructions that specify a render service to render the form template from a design format to the runtime format and a submit service to capture data submitted by a user;
  storing the coded instructions in association with the form template in a data storage structure, such that the coded instructions are dependent on the form template;
  designing a workflow by receiving a request to add the form template to a series of tasks to be automatically executed in an order during runtime, wherein the request to add the form template is received during a workflow-design process, which is separate from a form-design process;
  in response to the request to add the form template into the workflow during the workflow-design process, retrieving the coded instructions that are independent of the workflow being designed and are dependent on the form template; and
  automatically configuring the render service and the submit service to be executed with the form template at runtime.

14. The non-transitory machine-readable storage medium of claim 13, wherein the render service is operative to render the form template into a runtime file format selected from the group consisting of: portable document format (PDF) file format; Hyper Text Markup Language (HTML) file format; and a multimedia file format.

* * * * *